United States Patent
Ido et al.

(10) Patent No.: US 7,901,755 B2
(45) Date of Patent: Mar. 8, 2011

(54) HONEYCOMB STRUCTURE AND METHOD FOR MANUFACTURING THE SAME

(75) Inventors: Takahiko Ido, Ibi-gun (JP); Chizuru Kasai, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 298 days.

(21) Appl. No.: 11/925,394

(22) Filed: Oct. 26, 2007

(65) Prior Publication Data
US 2008/0118682 A1    May 22, 2008

(30) Foreign Application Priority Data
Nov. 16, 2006   (WO) .................. PCT/JP2006/322881

(51) Int. Cl.
B32B 3/12       (2006.01)
B01D 39/06      (2006.01)

(52) U.S. Cl. ..................... 428/116; 428/117; 55/523; 55/524

(58) Field of Classification Search ................. None
See application file for complete search history.

(56) References Cited

U.S. PATENT DOCUMENTS

| | | | |
|---|---|---|---|
| 6,696,130 B1 * | 2/2004 | Kasai et al. | 428/116 |
| 2004/0097370 A1 * | 5/2004 | Ichikawa et al. | 502/439 |
| 2005/0011174 A1 * | 1/2005 | Hong et al. | 55/523 |
| 2005/0079975 A1 | 4/2005 | Fujita | |
| 2005/0227869 A1 | 10/2005 | Ohno et al. | |
| 2005/0266992 A1 | 12/2005 | Ohno et al. | |
| 2006/0172113 A1 | 8/2006 | Kunieda | |
| 2006/0177629 A1 | 8/2006 | Kunieda | |
| 2006/0263574 A1 | 11/2006 | Tsunekawa et al. | |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292336 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 | 12/2006 | Ohno et al. | |
| 2006/0292341 A1 | 12/2006 | Ohno et al. | |
| 2006/0292342 A1 | 12/2006 | Ohno et al. | |

(Continued)

FOREIGN PATENT DOCUMENTS

EP    1447535    8/2004

(Continued)

*Primary Examiner* — Gordon R Baldwin
(74) *Attorney, Agent, or Firm* — Ditthavong Mori & Steiner, P.C.

(57) ABSTRACT

A honeycomb structure includes a plurality of pillar-shaped honeycomb fired bodies, each having a large number of cells longitudinally placed in parallel with one another with a cell wall therebetween. The honeycomb fired bodies are combined with one another by interposing adhesive layers containing at least ceramic particles. In the ceramic particles contained in the adhesive layers, the number of those particles having a particle diameter larger than an average pore diameter of the honeycomb fired body is set to 30% or less of the total number of the ceramic particles.

12 Claims, 2 Drawing Sheets

U.S. PATENT DOCUMENTS

| | | |
|---|---|---|
| 2006/0292393 A1 | 12/2006 | Kunieda |
| 2007/0004592 A1 | 1/2007 | Ohno et al. |
| 2007/0004593 A1 | 1/2007 | Ohno et al. |
| 2007/0039295 A1 | 2/2007 | Ohno |
| 2007/0077190 A1 | 4/2007 | Ohno |
| 2007/0212517 A1 | 9/2007 | Ohno et al. |
| 2008/0118682 A1 | 5/2008 | Ido et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0241465 A1 | 10/2008 | Ido |
| 2008/0241467 A1 | 10/2008 | Ohno et al. |
| 2008/0260991 A1 | 10/2008 | Konstandopoulos et al. |

FOREIGN PATENT DOCUMENTS

| | | |
|---|---|---|
| EP | 1500799 | 1/2005 |
| EP | 1550494 | 7/2005 |
| EP | 1707546 | 10/2006 |
| EP | 1719881 | 11/2006 |
| JP | 5-213681 | 8/1993 |
| JP | 5-254947 | 10/1993 |
| JP | 2004-130176 | 4/2004 |
| JP | 2004-224658 | 8/2004 |
| JP | 2005-218935 | 8/2005 |
| JP | 2005-342606 | 12/2005 |
| JP | 2005-349378 | 12/2005 |
| JP | 2006-223983 | 8/2006 |
| WO | WO 03/048072 | 6/2003 |

\* cited by examiner

HONEYCOMB STRUCTURE AND METHOD FOR MANUFACTURING THE SAME

CROSS-REFERENCE TO RELATED APPLICATIONS

The present application claims priority under 35 U.S.C. §119 to PCT Application No. PCT/JP2006/322881, filed Nov. 16, 2006. The contents of this application are incorperated herein by reference in their entirety.

BACKGROUND OF THE INVENTION

1. Field of the Invention

The present invention relates to a honeycomb structure and a method for manufacturing thereof.

2. Discussion of the Background

In order to convert exhaust gases discharged from internal combustion engines of vehicles, such as buses or trucks, construction machines and the like, a honeycomb catalyst, which allows exhaust gases to pass through the inside thereof to convert the exhaust gases has been used, and conventionally, as the honeycomb catalyst, for example, such a honeycomb catalyst has been proposed in which a material having a high specific surface area such as active alumina, and a catalyst metal such as platinum, are supported on the surface of a cordierite-base honeycomb structure having an integral structure and a low thermal expansion property. Moreover, the honeycomb catalyst has been also proposed in which an alkali-earth metal such as Ba is supported thereon as a NOx absorbing agent, so as to be used for NOx treatment in an atmosphere with excessive oxygen, such as an atmosphere in a lean burn engine and a diesel engine.

Here, in order to improve the conversion performance, it is necessary to increase the probability of contact between exhaust gases and a catalyst noble metal as well as the NOx absorbing agent. For this purpose, the supporting carrier needs to have a higher specific surface area, and the particle size of the catalyst metal needs to be made smaller and dispersed in a high level.

As the supporting carrier having a high specific surface area, a honeycomb structure including honeycomb fired bodies, each of which is formed by bonding a high specific surface material such as active alumina as a main material with an inorganic fibers serving as a reinforcing material by an inorganic binder to be molded into a honeycomb shape, followed by firing, has been known (for example, see The contents of Japanese Unexamined Patent Application Disclosure Nos. 2005-218935 A, 2005-349378 A, and 5-213681 A). Moreover, in order to achieve a large-size honeycomb structure, such a structured body in which honeycomb fired bodies are bonded to one another by interposing adhesive layers has been known.

When using this honeycomb structure as a catalyst supporting carrier used for converting exhaust gases from an automobile, however, cracks tend to occur in the adhesive layers that combine the honeycomb fired bodies to one another due to repeated vibrations, sometimes resulting in coming off some of the honeycomb fired body from the honeycomb structure, and further the damage may be caused in the honeycomb structure.

In order to prevent such damages from occurring in the honeycomb structural body, examinations have been conducted so as to increase the mutual adhesive strength between honeycomb fired bodies forming the honeycomb structure, and Patent Document 4 has disclosed a honeycomb structure in which: a plurality of honeycomb fired bodies are integrally combined with one another by interposing adhesive layers made from a joining material, and among inorganic particles in the joining material, those inorganic particles having a particle diameter (μm) that is 1.1 times or more the surface roughness Ra (μm) of the outer wall of the honeycomb fired body are made not to be contained at a rate exceeding 30% by weight to the total weight of the joining material.

Japanese Unexamined Patent Application Disclosure No. 2004-130176 A discloses that, by determining the particle diameter of the inorganic particles contained in the joining material in this manner, the honeycomb fired bodies are mutually combined with one another more firmly to provide an integral honeycomb structure.

The contents of Japanese Unexamined Patent Application Disclosure Nos. 2005-218935 A, 2005-349378 A, 5-213681 A, and 2004-130176 A are incorporated herein by reference in their entirety.

SUMMARY OF THE INVENTION

A honeycomb structure of the present invention includes a plurality of pillar-shaped honeycomb fired bodies, each having a large number of cells longitudinally placed in parallel with one another with a cell wall therebetween. The honeycomb fired bodies are combined with one another by interposing adhesive layers containing at least ceramic particles. In the ceramic particles contained in the adhesive layers, the number of those particles having a particle diameter larger than an average pore diameter of the honeycomb fired body is set to 30% or less of the total number of the ceramic particles.

In the honeycomb structure of the present invention, the ceramic particles contained in the adhesive layers preferably have an average particle diameter of about 0.2 μm or less.

In the honeycomb structure of the present invention, the adhesive layers preferably contain an inorganic fiber and/or a whisker.

In the honeycomb structure of the present invention, the ceramic particles contained in the adhesive layers include preferably at least one kind selected from the group consisting of alumina, silicon carbide, silica, zirconia, zeolite, mullite and cordierite.

In the honeycomb structure of the present invention, a catalyst is preferably supported thereon, and the catalyst preferably contains at least one kind selected from the group consisting of a noble metal, an alkali metal, an alkali-earth metal and an oxide.

Moreover, the honeycomb structure of the present invention is preferably used for converting an exhaust gas from a vehicle.

The inorganic fiber and/or the whisker contained in the adhesive layers preferably include at least one of alumina, silica, silicon carbide, silica-alumina, glass, potassium titanate, and aluminum borate.

The honeycomb fired bodies of the honeycomb structure preferably include an inorganic particle, and an inorganic fiber and/or a whisker. The inorganic particle preferably includes at least one of alumina, silica, zirconia, titania, ceria, mullite, and zeolite. The inorganic fiber and/or the whisker preferably include least one of alumina, silica, silicon carbide, silica-alumina, glass, potassium titanate, and aluminum borate.

The honeycomb structure is preferably formed of the honeycomb fired bodies which are produced by being fired at a temperature of about 500 to about 1200° C.

A method for manufacturing a honeycomb structure of the present invention includes the step of: combining a plurality of pillar-shaped honeycomb fired bodies, each having a large number of cells longitudinally placed in parallel with one another with a cell wall therebetween, with one another by interposing adhesive layers containing at least ceramic particles. In the ceramic particles contained in raw materials for the adhesive layers, the number of those particles having a particle diameter larger than an average pore diameter of the honeycomb fired body is set to 30% or less of the total number of the ceramic particles.

In the method for manufacturing a honeycomb structure of the present invention, the ceramic particles contained in the raw materials for the adhesive layers preferably have an average particle diameter of about 0.2 μm or less.

In the method for manufacturing a honeycomb structure of the present invention, the raw materials for the adhesive layers preferably contain an inorganic fiber and/or a whisker. The inorganic fiber and/or the whisker preferably include at least one of alumina, silica, silicon carbide, silica-alumina, glass, potassium titanate, and aluminum borate.

In the method for manufacturing a honeycomb structure of the present invention, the ceramic particles contained in the raw materials for the adhesive layers include preferably at least one kind selected from the group consisting of alumina, silicon carbide, silica, zirconia, zeolite, mullite and cordierite.

The honeycomb fired bodies which may be used in the method for manufacturing a honeycomb structure preferably include an inorganic particle, and an inorganic fiber and/or a whisker. The inorganic particle includes at least one of alumina, silica, zirconia, titania, ceria, mullite, and zeolite. The inorganic fiber and/or the whisker preferably include at least one of alumina, silica, silicon carbide, silica-alumina, glass, potassium titanate, and aluminum borate.

The raw materials for the adhesive layer which may be used in the method for manufacturing a honeycomb structure preferably include an inorganic binder and an organic binder. The inorganic binder preferably includes at least one of an inorganic sol and a clay-type binder. The inorganic sol preferably includes at least one of alumina sol, silica sol, titania sol, and water glass. The clay-type binder preferably includes at least one of white clay, kaolin, montmorillonite, sepiolite, and attapulgite.

The honeycomb fired bodies produced by being fired at a temperature of about 500 to about 1200° C. are preferably utilized in the method for manufacturing a honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

The following description will discuss a honeycomb structure according to the embodiments of the present invention and a method for manufacturing the honeycomb structure.

The honeycomb structure according to the embodiments of the present invention is a honeycomb structure having a structure in which a plurality of pillar-shaped honeycomb fired bodies, each having a number of cells longitudinally placed in parallel with one another with a cell wall therebetween, are combined with one another by interposing adhesive layers containing at least ceramic particles, and in the ceramic particles contained in the adhesive layers, the number of those particles having a particle diameter larger than the average pore diameter of the honeycomb fired body is set to about 30% or less of the total number of the ceramic particles.

The method for manufacturing a honeycomb structure according to the embodiments of the present invention includes the step of combining a plurality of pillar-shaped honeycomb fired bodies, each having a large number of cells longitudinally placed in parallel with one another with a cell wall therebetween, with one another by interposing adhesive layers containing at least ceramic particles. In the ceramic particles contained in raw materials for the adhesive layers, the number of those particles having a particle diameter larger than an average pore diameter of the honeycomb fired body is set to about 30% or less of the total number of the ceramic particles.

In the honeycomb structure according to the embodiment of the present invention, in the ceramic particles contained in the adhesive layers, the number of those particles having a particle diameter larger than an average pore diameter of the honeycomb fired body is set to 30% or less of the total number of the ceramic particles; therefore, upon bonding, a large number of the ceramic particles are allowed to enter the pores on the surface of the honeycomb fired body so that an anchoring effect may be exerted. For this reason, it becomes easy to increase the mutual adhesive strength between the honeycomb fired bodies in the honeycomb structure.

Therefore, when the honeycomb structure according to the embodiment of the present invention is used as a catalyst supporting carrier for converting exhaust gases from an automobile, the honeycomb fired bodies are unlikely to come off from the honeycomb structure and less damage occurs in the honeycomb structure.

In accordance with the method for manufacturing the honeycomb structure according to the embodiment the present invention, since the particle diameter distribution of the ceramic particles contained in the raw materials for the adhesive layer is adjusted into an appropriate range, the particle diameter distribution of the ceramic particles contained in the adhesive layer may be controlled within a desired range with respect to the average pore diameter of the honeycomb fired body, thereby making it easy to manufacture a honeycomb structure in which the honeycomb fired bodies are firmly bonded to one another.

First, the honeycomb structure according to the embodiment of the present invention is explained.

Figure 1:
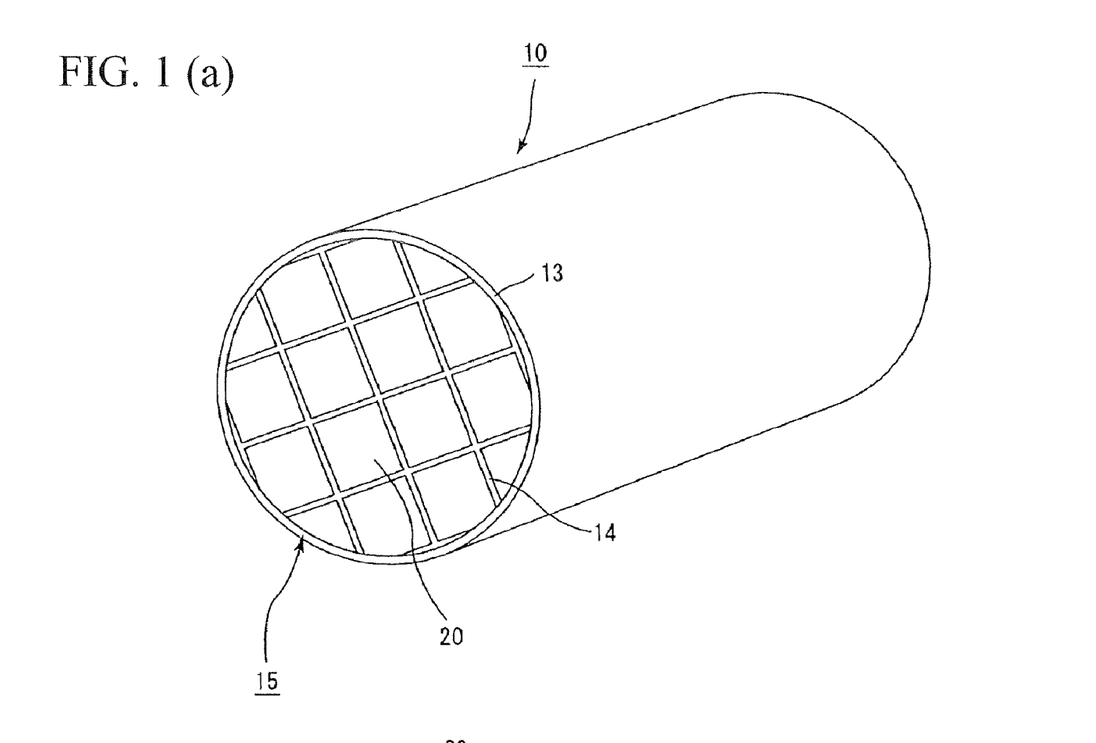
FIG. 1(a) is a perspective view that schematically shows one example of a honeycomb structure according to the embodiments of the present invention.
FIG. 1(b) is a perspective view that schematically shows one example of a honeycomb fired body forming the honeycomb structure according to the embodiments of the present invention.

FIG. 1(a) is a perspective view that schematically shows one example of a honeycomb structure according to the embodiment of the present invention, and FIG. 1(b) is a perspective view that schematically shows one example of a honeycomb fired body forming the honeycomb structure according to the embodiment of the present invention.

In a honeycomb structure 10 according to the embodiment of the present invention shown in FIG. 1(a), a plurality of honeycomb fired bodies 20, each including a ceramic material such as porous alumina with a rectangular pillar-shape as shown in FIG. 1(b), are combined with one another by interposing adhesive layers 14 to constitute a ceramic block 15, and a sealing material layer 13 is formed on the periphery of the ceramic block 15.

In the present specification, the shape indicated by the word "pillar" refers to any desired shape of a pillar including a round pillar, an oval pillar, a polygonal pillar and the like.

Since the honeycomb structure 10 according to the embodiment of the present invention is formed by a plurality of honeycomb fired bodies 20 combined with one another by interposing the adhesive layers 14, it is highly resistant to thermal impact and vibrations. This is presumably because, even when a temperature distribution is occurred in the honeycomb structure 10 due to an abrupt temperature change or the like, the temperature difference occurring in each of the honeycomb fired bodies 20 can be restrained to a small level. Alternatively, this is presumably because the thermal impact or vibrations can be alleviated by the adhesive layers 14.

Moreover, even when a crack occurs in the honeycomb fired body 20 due to a thermal stress or the like, the adhesive layers 14 make it easy to prevent the crack progressing over the entire honeycomb structure 10, and also serve as frames for the honeycomb structure 10 to retain the shape as the honeycomb structure.

Moreover, in the honeycomb structure according to the embodiment of the present invention, in the ceramic particles contained in the adhesive layers, the number of those particles having a particle diameter larger than the average pore diameter of the honeycomb fired body is set to 30% or less of the total number of the ceramic particles.

By setting the relationship between the average pore diameter of the honeycomb fired body, and the particle diameter as well as the number of particles of the ceramic particles contained in the adhesive layers, within the above-mentioned range, more ceramic particles are allowed to enter the inside of each pore of the surface of the honeycomb fired body to generate an anchoring effect, thereby making it easy to increase the adhesive strength of the adhesive layer to the honeycomb fired body; thus, the honeycomb fired bodies may firmly be bonded to one another by interposing these adhesive layers.

In order to determine whether or not the relationship between the average pore diameter of the honeycomb fired body, and the particle diameter as well as the number of particles of the ceramic particles is kept within the range, it is necessary to measure the particle diameter distribution of the ceramic particles in the adhesive layers and the average pore diameter of the honeycomb fired body.

The particle diameter distribution of the ceramic particles can be measured by a particle diameter distribution measuring method using laser diffraction scattering method.

For example, the particle diameter distribution represented by the particle diameter and frequency is measured by using a MALVERN MASTERSIZER MICRO (MODEL MAF 5001), and the particle diameter (μm) corresponding to a frequency of 70% counted in succession from the smallest particle diameter is obtained so that the 70% particle diameter is calculated.

Moreover, the average pore diameter of the honeycomb fired body can be measured by a molded body pore-diameter distribution measuring method by using a mercury injection method defined by JIS R 1655.

In the case where the 70% particle diameter of the ceramic particles measured by the method is equal to or smaller than the average pore diameter of the honeycomb fired body, the number of those ceramic particles whose particle diameter is larger than the average pore diameter of the honeycomb fired body corresponds to 30% or less of the total number of the ceramic particles, with the result that the relationship between the average pore diameter of the honeycomb fired body and the particle diameter and the number of particles of the ceramic particles is set within the range defined by the present invention.

In this manner, in the honeycomb structure according to the embodiment of the present invention, honeycomb fired bodies forming the honeycomb structure are mutually bonded to one another firmly. For this reason, when the honeycomb structure according to the embodiment of the present invention is used as a catalyst supporting carrier for converting exhaust gases from an automobile, the honeycomb fired bodies are unlikely to come off from the honeycomb structure and less damage occurs in the honeycomb structure.

In the honeycomb structure according to the embodiment of the present invention, the average particle diameter of the ceramic particles contained in the adhesive layers is preferably set to about 0.2 μm or less.

This is because, when the average particle diameter of those ceramic particles that devote to the bonding process is about 0.2 μm or less, it becomes easy to desirably increase the adhesive strength between the honeycomb fired bodies.

In the honeycomb structure according to the embodiment of the present invention, the ceramic particles to be contained in the adhesive layers include preferably at least one kind selected from the group consisting of alumina, silicon carbide, silica, zirconia, zeolite, mullite and cordierite.

Among these, in particular, alumina is preferably used.

In the honeycomb structure according to the embodiment of the present invention, it is preferable that the adhesive layers contain inorganic fibers and/or whiskers.

When these inorganic fibers and/or whiskers are contained, the adhesive strength between the honeycomb fired bodies can be further improved.

As the inorganic fibers and whiskers, inorganic fibers and whiskers, made of alumina, silica, silicon carbide, silica-alumina, glass, potassium titanate, aluminum borate, or the like, are preferably used. One kind of these may be used alone, or two or more kinds of these may be used in combination. Among the inorganic fibers and/or whiskers, aluminum borate whiskers are more preferably used.

Here, in the present specification, the inorganic fibers and whiskers refer to those having an average aspect ratio (length/diameter) exceeding 5. Moreover, with respect to the inorganic fibers and whiskers, a preferable average aspect ratio is set in a range from about 10 to about 1000.

Moreover, in addition to the ceramic particles, and inorganic fibers and/or whiskers that have been discussed above, the adhesive layer preferably contains an adhesive paste containing an inorganic binder and an organic binder as raw materials.

As the inorganic binder, an inorganic sol, a clay-type binder and the like may be used, and specific examples of the inorganic sol include alumina sol, silica sol, titania sol and water glass. Moreover, examples of the clay-type binder include clays of the chain-type structure, such as white clay, kaolin, montmorillonite, sepiolite and attapulgite. Each of these may be used alone, or two or more kinds of these may be used in combination.

Among these, at least one kind of material selected from the group consisting of alumina sol, silica sol, titania sol, water glass, sepiolite and attapulgite is preferably used.

As the organic binder, examples thereof include polyvinyl alcohol, methyl cellulose, ethyl cellulose, carboxymethyl cellulose and the like. Each of these may be used alone or two or more kinds of these may be used in combination. Among these organic binders, carboxymethyl cellulose is preferably used.

With respect to the amount of the ceramic particles contained in the adhesive paste, a preferable lower limit is about 30% by weight, and a more preferable lower limit is about 40% by weight to the total weight (hereinafter, referred to as solid component total weight) of solid component in the raw materials.

In contrast, a preferable upper limit is about 80% by weight, and a more preferable upper limit is about 75% by weight.

The content of ceramic particles of about 30% or more by weight does not tend to cause an insufficient anchoring effect nor to cause a reduction in adhesive strength between the honeycomb fired bodies; in contrast, the content of ceramic particles of about 80% or less by weight does not tend to cause a reduction in adhesive strength of the adhesive layers or a reduction in adhesive strength between the adhesive layers and honeycomb fired bodies.

With respect to the total amount of the inorganic fibers and/or the whiskers contained in the adhesive paste, a preferable lower limit is set to about 5% by weight to the total weight of the solid components. In contrast, a preferable upper limit is about 30% by weight.

The content of the inorganic fibers and/or whiskers of about 5% or more by weight does not tend to reduce the strength of the adhesive layer; in contrast, the content of the inorganic fibers and/or whiskers of 30% or less by weight does not tend to cause a reduction in the bulk density of the adhesive layers or a reduction in the adhesive strength of the adhesive layers.

With respect to the amount of the inorganic binder contained in the adhesive paste, a preferable lower limit is set to about 10% by weight to the solid component total weight. In contrast, a preferable upper limit is set to about 40% by weight.

The content of the inorganic binder of about 10% or more by weight does not tend to cause a reduction in adhesive strength between the honeycomb fired bodies.

The content of the inorganic binder of about 40% or less by weight does not lead to insufficient supply of ceramic particles, and inorganic fibers and/or whiskers so that the strength of the adhesive layers does not tend to be reduced.

Moreover, in the honeycomb structure according to the embodiment of the present invention, the adhesive layers are not necessarily formed over the entire side faces of the honeycomb fired body, and may be formed on only one portion of the side faces.

In the case where the adhesive layer is formed on only one portion of the side faces, the bulk density of the entire honeycomb structure is lowered so that the temperature rising property is improved. Moreover, since exhaust gases are allowed to come into contact with the side faces of the honeycomb fired body, the converting process of exhaust gases can be improved.

The following description will discuss the honeycomb fired body forming a honeycomb structure according to the embodiment of the present invention.

A honeycomb fired body 20 shown in FIG. 1(b) has a structure in which a large number of cells 21 are longitudinally (in a direction shown by arrow a in FIG. 1(b)) placed in parallel with one another with a cell wall 22 therebetween, and fluids such as exhaust gases are allowed to flow through these cells 21.

Although not particularly limited, the lower limit of the thickness of the cell wall 22, which forms a wall between the cells 21, is preferably about 0.05 mm, more preferably about 0.10 mm, and further more preferably about 0.15 mm. In contrast, the upper limit thereof is preferably about 0.35 mm, more preferably about 0.30 mm, and further more preferably about 0.25 mm.

The thickness of the cell wall 22 of about 0.05 mm or more does not tend to reduce the strength of the honeycomb fired body 20; in contrast, the thickness of the cell wall 22 of about 0.35 mm or less does not tend to cause a reduction in the contact area with exhaust gases when the honeycomb structure is used as a catalyst supporting carrier for converting exhaust gases, facilitating sufficiently deep penetration of exhaust gases, with the result that the catalyst supported on the inside of the cell wall 22 is easily made in contact with exhaust gases to improve the gas-conversion performance.

With respect to the cell density of the honeycomb fired body, the lower limit thereof is preferably about 15.5 pcs/cm$^2$ (about 100 cpsi), more preferably about 46.5 pcs/cm$^2$ (about 300 cpsi), further more preferably about 62.0 pcs/cm$^2$ (about 400 cpsi). In contrast, the upper limit of the cell density is preferably about 186 pcs/cm$^2$ (about 1200 cpsi), more preferably about 170.5 pcs/cm$^2$ (about 1100 cpsi), and further more preferably about 155 pcs/cm$^2$ (about 1000 cpsi).

The cell density of about 15.5 pcs/cm$^2$ or more does not tend to cause a reduction in the wall area to be made in contact with exhaust gases inside the honeycomb fired body when the honeycomb structure is used as a catalyst supporting carrier for converting exhaust gases, and the cell density of about 186 pcs/cm$^2$ or less does not tend to cause an increase in the pressure loss, making it easy to manufacture the honeycomb fired body.

Although not particularly limited, the cross sectional shape of cells formed in the honeycomb fired body may be formed into an almost triangular shape or a almost hexagonal shape, in addition to a square shape as shown in FIG. 1(b).

Moreover, with respect to the shape of the honeycomb fired body, although not particularly limited, those shapes that make the honeycomb fired bodies easily combined with one another are preferable, and with respect to the shape of the cross section perpendicular to the longitudinal direction (hereinafter, referred to simply as "cross section"), a square shape, a rectangular shape, a hexagonal shape, an arc shape and the like may be exemplified.

Although not particularly limited, the composition of the honeycomb fired body is preferably made to contain inorganic particles, and the inorganic fibers and/or whiskers.

Thus, the inorganic particles make it easy to increase the specific surface area, and the inorganic fibers and/or whiskers make it easy to enhance the strength of the honeycomb fired body.

Preferable examples of the inorganic particles include those particles including alumina, silica, zirconia, titania, ceria, mullite, zeolite or the like. One kind of these particles may be used alone, or two or more kinds of these may be used in combination.

Here, among these, in particular, alumina particles and ceria particles are preferably used.

As the inorganic fibers and/or whiskers, those materials that are the same as the inorganic fibers and/or whiskers contained in the adhesive layer may be used; therefore, the detailed description thereof is omitted.

Here, the inorganic fibers and/or whiskers to be used for the raw materials for the honeycomb fired body, and the inorganic fibers and/or whiskers to be used for the raw material for the adhesive layers may be the same kind of material, or different kinds of materials.

With respect to the amount of the inorganic particles contained in the honeycomb fired body, the lower limit is preferably about 30% by weight, more preferably about 40% by weight, and further more preferably about 50% by weight.

In contrast, the upper limit thereof is preferably set about 97% by weight, more preferably about 90% by weight, further more preferably about 80% by weight, and still further more preferably about 75% by weight.

The content of the inorganic particles of about 30% or more by weight does not tend to make the amount of inorganic particles that devote to improvements of the specific surface area relatively smaller, with the result that the specific surface area of the honeycomb structure does not tend to become smaller, facilitating high dispersion of a catalyst upon supporting the catalyst. In contrast, the content of the inorganic particles of about 97% or less by weight does not tend to make the amount of the inorganic fibers and/or whiskers that devote to improvements in strength relatively smaller, preventing a reduction in the strength of the honeycomb structure.

With respect to the total amount of the inorganic fibers and/or whiskers contained in the honeycomb fired body, the lower limit is preferably about 3% by weight, more preferably about 5% by weight, and further more preferably about 8% by weight. In contrast, the upper limit is preferably about 70% by weight, more preferably about 50% by weight, further more preferably about 40% by weight, and still further more preferably about 30% by weight.

The content of the inorganic fibers and/or whiskers of about 3% or more by weight does not tend to cause a reduction in the strength of the honeycomb structure; in contrast, the content thereof of about 50% or less by weight does not tend to make the amount of inorganic particles that devote to improvements of the specific surface area relatively smaller, with the result that the specific surface area of the honeycomb structure does not tend to become smaller, facilitating high dispersion of a catalyst upon supporting the catalyst.

Moreover, the honeycomb fired body is preferably manufactured by using a material composition that is a mixture containing the inorganic fibers and/or whiskers, and the inorganic particles, and an inorganic binder.

By thus using such a material composition including the inorganic binder, a honeycomb fired body that has sufficient strength may easily be obtained even when the temperature for firing a raw molded body is set to a low level.

As the inorganic binder contained in the material composition, the same kind of material as the inorganic binder contained in the raw material for the adhesive layer may be used; therefore, the detailed description thereof is omitted.

Here, the inorganic binder to be used for the material for the honeycomb fired body and the inorganic binder to be used for the raw material for the adhesive layers may be the same kind of material, or may be different kinds of materials.

With respect to the amount of the inorganic binder contained in the material composition, the lower limit thereof as a solid component is preferably about 5% by weight, more preferably about 10% by weight, and further more preferably about 15% by weight, and with respect to the total amount of the solid components of the inorganic fibers and/or whiskers, and the inorganic particles, and the inorganic binder contained in the material composition; in contrast, the upper limit thereof is preferably about 50% by weight, more preferably about 40% by weight, and further more preferably about 35% by weight, with respect thereto.

The amount of the inorganic binder of about 5% or more by weight does not tend to cause a reduction in the strength of the manufactured honeycomb structure; in contrast, the amount of the inorganic binder of about 50% or less by weight does not tend to cause degradation in the moldability of the material composition.

Moreover, a catalyst is preferably supported on the honeycomb structure according to the embodiment of the present invention.

Examples of the catalyst include a noble metal, an alkali metal, an alkali-earth metal, an oxide, and the like, although not particularly limited thereto.

Each of these may be used alone, or two or more kinds of these may be used in combination.

Examples of the noble metal include platinum, palladium, rhodium and the like; examples of the alkali metal include potassium, sodium, and the like; examples of the alkali-earth metal include barium and the like; and examples of the oxide include perovskite ($La_{0.75}K_{0.25}MnO_3$, etc.), $CeO_2$, and the like.

Here, the timing at which the catalyst is supported is not particularly limited, and the supporting process may be carried out after the honeycomb structure has been manufactured or may be carried out on inorganic particles which are the material for the honeycomb fired body. Moreover, the catalyst supporting method is not particularly limited, and may be carried out, for example, by an impregnation method and the like.

The use of the above-mentioned honeycomb structure (honeycomb catalyst) having a catalyst supported thereon is not particularly limited, and may include use as a so-called three-way catalyst and NOx-absorbing catalyst used for converting exhaust gases from a vehicle.

Furthermore, the honeycomb structure may be utilized in applications in which it is used with no catalyst supported thereon (for example, an adsorbent or the like used for adsorbing a gaseous component and a liquid component).

Next, the following description will discuss the method for manufacturing a honeycomb structure according to the embodiment of the present invention.

The following description will discuss the method of manufacturing the honeycomb structure according to the embodiment of the present invention successively in the order of processes.

First, a material composition is prepared, and an extrusion molding process or the like is carried out by using this material composition to form a molded body.

With respect to the material composition, for example, inorganic particles, inorganic fibers and/or whiskers are used as main components, and in addition to these, an inorganic binder, an organic binder, a dispersion medium and a molding assistant are added thereto, if necessary, in accordance with the required moldability.

Examples of the inorganic particles, inorganic fibers and whiskers contained in the material composition include those materials that have been exemplified as materials to be contained in the honeycomb fired body, although not particularly limited thereto.

The amounts of the inorganic particles, inorganic fibers and/or whiskers contained in the material composition are desirably determined so that the rate of the inorganic particles, inorganic fibers and/or whiskers contained in the manufactured honeycomb fired body is set in the aforementioned range.

The materials and compounding amounts thereof to be used as the inorganic binder are not particularly limited, and the description thereof is omitted since those have already been discussed above.

Examples of the organic binder include methylcellulose, carboxy methylcellulose, hydroxy ethylcellulose, and the like, although not particularly limited thereto.

Each of these may be used alone, or two or more kinds of these may be used in combination.

The compounding amount of the organic binder is preferably set in a range from about 1 to about 10 parts by weight as a solid component, relative to the total 100 parts by weight of the solid components of the inorganic particles, the inorganic fibers, the whiskers and the inorganic binder.

Examples of the dispersion medium include water, an organic solvent (benzene or the like), alcohol (methanol or the like) and the like, although not particularly limited thereto.

Examples of the molding assistant include ethylene glycol, dextrin, fatty acid, fatty acid soap, polyalcohol and the like, although not particularly limited thereto.

The preparation of the material composition includes, although not particularly limited, mixing and kneading processes and, for example, a mixer, an attritor or the like may be used for the mixing process, and a kneader or the like may be used so as to carry out a sufficient kneading.

A preferable example of the method for molding the material composition includes, although not particularly limited, a molding process carried out by using the above-mentioned extrusion-molding process or the like so as to form a shape having cells.

Next, drying treatment is carried out on the resulting molded body by using a drying apparatus, if necessary.

As the drying apparatus, examples thereof include: a microwave drying apparatus, a hot-air drying apparatus, a dielectric drying apparatus, a reduced-pressure drying apparatus, a vacuum drying apparatus, a frozen drying apparatus, and the like.

Next, a degreasing treatment is carried out on the resulting dried body, if necessary.

The degreasing conditions are not particularly limited, and are appropriately determined depending on the kinds and amounts of organic substances contained in the molded body, and preferably set at about 400° C. for about 2 hours.

Next, the molded body dried and degreased depending on need is fired.

Although not particularly limited, the firing condition is preferably set in a range from about 500 to about 1200° C., and more preferably in a range from about 600 to about 1000° C.

The reason for this setting is because the firing temperature of about 500° C. or more tends to allow the inorganic binder to exert the bonding function and also to facilitate progress in the firing of ceramic particles and the like, preventing a reduction in the strength of the honeycomb structure, and because the firing temperature of about 1200° C. or less does not tend to cause the firing of ceramic particles and the like to progress too quickly, preventing a reduction in the specific surface area per unit volume and facilitating sufficient disperssion of the catalyst supported on it as a catalyst supporting carrier so as to convert exhaust gases in the honeycomb structure.

By using these processes, a pillar-shaped honeycomb fired body having a number of cells longitudinally placed in parallel with one another with a cell wall therebetween is manufactured.

Here, the average pore diameter of the honeycomb fired body can be adjusted by the materials to be blended in the material composition and by the firing conditions thereof.

Next, adhesive paste that is a raw material for the adhesive layer is prepared.

The adhesive paste is a paste agent that forms a raw material for the adhesive layers of the honeycomb structure as described above, and contains at least ceramic particles, and among the ceramic particles contained in the adhesive paste, the number of those particles having a particle diameter larger than the average pore diameter of the honeycomb fired body to be bonded is set to 30% or less of the total number of the ceramic particles.

Here, the particle diameter distribution of the ceramic particles contained in the adhesive layers after a honeycomb structure has been formed through processes that will be described later is the same as the particle diameter distribution of the ceramic particles contained in the raw material for the adhesive layers.

For this reason, by controlling the relationship between the particle diameter and the number of particles of ceramic particles to be compounded upon preparing the adhesive paste and the average pore diameter of the honeycomb fired body, the relationship between the particle diameter and the number of particles of the ceramic particles contained in the adhesive layers of the manufactured honeycomb structure and the average pore diameter of the honeycomb fired body can be controlled into the range. Here, the particle diameter distribution of the ceramic particles can be adjusted by using a conventionally known method, for example, classification and the like.

Description of details of the materials and compounding amounts thereof to be contained in the adhesive paste is omitted since those have already been discussed.

Next, the honeycomb fired bodies are combined with one another to form a honeycomb aggregated body having a predetermined size.

The honeycomb aggregated body may be formed by using, for example, a method in which an adhesive paste is applied to side faces of honeycomb fired bodies to form adhesive paste layers so that the honeycomb fired bodies are combined with one another, or a method in which respective honeycomb fired bodies are temporarily secured to a molding box having almost the same shape as a ceramic block to be formed, and in this state, the adhesive paste is injected between the respective honeycomb fired bodies.

This honeycomb aggregated body is then heated for drying and solidifying the adhesive paste layers so that a ceramic block in which the honeycomb fired bodies are firmly combined with one another by interposing the adhesive layers is formed. The number of the honeycomb fired bodies to be combined is appropriately determined in accordance with the size of the honeycomb structure. Here, if necessary, cutting, grinding or the like may be carried out on the ceramic block to be formed into a round pillar shape as shown in FIG. 1(a).

Here, the thickness of each adhesive layer to be formed in the processes is preferably set in a range from about 0.5 to about 5 mm.

The thickness of the adhesive layer of about 0.5 mm or more may easily provide a sufficient combining strength, and since the adhesive layer is a portion that does not function as a catalyst supporting carrier, the thickness of about 5 mm or less does not tend to cause a reduction in the specific surface area per unit volume of the honeycomb structure, making it easy to highly disperse a catalyst sufficiently, when the honeycomb structure is used as a catalyst supporting carrier for converting exhaust gases.

Moreover, the thickness of the adhesive layer exceeding about 5 mm tends to cause an increase in the pressure loss.

Next, if necessary, a sealing material paste is applied to the peripheral face of the ceramic block and dried to be solidified, if necessary, so that a sealing material layer is formed.

By forming the sealing material layer, the peripheral face of the ceramic block can be protected so that the strength of the honeycomb structure is subsequently increased.

Although not particularly limited, the material for the sealing material paste may be the same as the material for the adhesive paste, or may be those including different materials.

Moreover, in the case where the sealing material paste is made from the same material as the adhesive paste, the compounding ratio of the component may be the same or different.

Although not particularly limited, the thickness of the sealing material layer is preferably set in a range from about 0.1 to about 2 mm. The thickness of about 0.1 mm or more may facilitate protection of the peripheral face and an increase in the strength; whereas, the thickness of about 2 mm or less does not tend to reduce the specific surface area per unit volume of the honeycomb structure, facilitating sufficient dispersion of the catalyst upon using it as a catalyst supporting carrier so as to convert exhaust gases in the honeycomb structure.

Moreover, in the manufacturing method according to the embodiment of the present invention, after a plurality of honeycomb fired bodies have been combined with one another by interposing the adhesive layers (after forming the sealing material layer in the case where the sealing material layer is provided), calcination is preferably carried out.

This is because, in the case, for example, where an organic binder is contained in the adhesive layers and the sealing material layer, the organic binder can be degreased and removed.

The conditions of the calcination are appropriately determined depending on the kinds and amounts of the organic substances contained therein, and preferably set at about 700° C. for about 2 hours.

In accordance with the method for manufacturing the honeycomb structure according to the embodiment of the present invention, since the particle diameter distribution of the ceramic particles contained in the raw material for the adhesive layer is adjusted into an appropriate range, the particle diameter distribution of the ceramic particles contained in the adhesive layer may easily be controlled within a desired range relative to the average pore diameter of the honeycomb fired body, thereby making it easy to manufacture a honeycomb structure in which the honeycomb fired bodies are firmly bonded to one another.

In the case of a honeycomb structure as disclosed in Japanese Unexamined Patent Application Disclosure No. 2004-130176 A in which the particle diameter and the weight ratio of the inorganic particles in the joining material are set to predetermined values, the mutual adhesive strength between the honeycomb fired bodies may become weak, depending on the kind of the inorganic particles in the joining material and the characteristics such as average pore diameter and the like of the manufactured honeycomb fired body, and in the case where such a honeycomb structure is used as a catalyst supporting carrier for converting exhaust gases from an automobile, problems tend to be raised in that one portion of the honeycomb fired bodies comes off from the honeycomb structure or damages are caused in the honeycomb structure.

When the honeycomb structure manufactured by the method for manufacturing a honeycomb structure according to the embodiment of the present invention is used as a catalyst supporting carrier for converting exhaust gases from an automobile, the honeycomb fired bodies are unlikely to come off from the honeycomb structure and less damage occurs in the honeycomb structure.

EXAMPLES

The following description will discuss the present invention in detail by means of examples; however, the present invention is not intended to be limited by these examples.

Example 1

2250 g of γ-alumina particles (average particle diameter: 2 μm), 680 g of aluminum borate whiskers (average fiber diameter: 0.5 to 1 μm; average fiber length: 10 to 30 μm) and 2600 g of silica sol (solid concentration: 30% by weight) were mixed, and to the resulting mixture were added 320 g of methylcellulose serving as an organic binder, 290 g of a lubricant (UNILUB, made by NOF Corporation) and 225 g of a plasticizer (glycerin), and the mixture was further mixed and kneaded to obtain a mixed composition. This mixed composition was extrusion-molded by using an extrusion molding machine so that a raw molded product was obtained.

Next, the raw molded product was sufficiently dried by using a micro-wave drying apparatus and a hot-air drying apparatus, and further maintained at 400° C. for 2 hours so as to be degreased.

Thereafter, the resulting product was maintained at 800° C. for 2 hours to be fired so that a honeycomb fired body α, which had a rectangular pillar shape (37 mm×37 mm×75 mm), a cell density of 93 cells/cm$^2$ (600 cpsi), a thickness of a cell wall of 0.2 mm, and a rectangular (square) cross sectional shape of the cell, was obtained.

Based upon JIS R 1655, the average pore diameter of this honeycomb fired body α was measured by a porosimeter (AutoPore III 9420, made by Shimadzu Corp.) through the mercury injection method, and as a result, the measured value 0.1 μm was obtained.

Moreover, based upon JIS B 0601, the surface roughness Ra of the side face of the honeycomb fired body α was measured by a surface roughness measuring device (SURF-COM-920A, made by Tokyo Seimitsu Co., Ltd.), and as a result, the measured value 1.9 μm was obtained.

Moreover, 29% by weight of γ-alumina particles (70% particle diameter: 0.1 μm, average particle diameter: 0.09 μm), 7% by weight of aluminum borate whiskers (average fiber diameter: 0.5 to 1 μm; fiber length: 10 to 30 μm), 34% by weight of silica sol (solid concentration: 30% by weight), 5% by weight of carboxymethyl cellulose (CMC) and 25% by weight of water were mixed to prepare an adhesive paste and sealing material paste.

The honeycomb fired body α was placed on a laminating base having a V-shaped cross section, and the adhesive paste prepared as described above was applied to the side faces of the honeycomb fired body α that face up to form an adhesive paste layer, and another honeycomb fired body α was stacked on this adhesive paste layer.

These processes of applying the adhesive paste to the end faces on the upper side of the honeycomb fired body α and of stacking the honeycomb fired body thereon are successively repeated; thus, the honeycomb fired bodies were combined with one another so that a honeycomb aggregated body was formed.

At this time, the adhesive paste was applied to each of the honeycomb fired bodies α on total three regions, that is, areas within 10 mm from the two ends of the side face as well as on areas within 5 mm from the center of the side face toward the two ends.

Next, this honeycomb aggregated body was heated at 100° C. for one hour to dry and solidify the adhesive paste to be formed into adhesive layers so that a ceramic block was formed. At this time, the average value of the thickness of the adhesive layer was 1 mm.

Successively, this ceramic block was cut by using a diamond cutter into a round pillar shape so that the pattern of the end face of the ceramic block became virtually point-symmetric to the center of the circle, as shown in FIG. 1(a); thereafter, a sealing material paste was applied to the peripheral face in such a manner that the thickness of the sealing material layer was 0.5 mm so as to coat the peripheral face of the ceramic block.

This was then dried at 120° C., and further maintained at 700° C. for two hours so that the adhesive layers and the sealing material layer were degreased; thus, a round pillar-shaped honeycomb structure (143.8 mm in diameter×75 mm in height) was obtained.

Push-out strength of the honeycomb structure manufactured in the present Example was measured.

Figure 2:
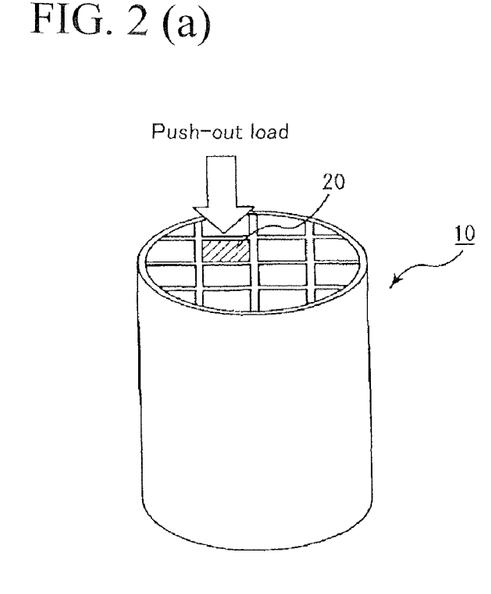
FIGS. 2(a) and 2(b) are conceptual diagrams that schematically show a method of push-out strength test.

Specifically, as shown in FIGS. 2(a) and 2(b), after a honeycomb structure 10 including a plurality of honeycomb fired bodies 20 combined with one another by interposing adhesive layers, had been placed on a base 45, a push-out load (pressing rate 1 mm/min) was imposed on a honeycomb fired body 20 (FIG. 2(a), shaded part in the middle) near the center by using a jig member 40 having a diameter of 30 mm, made of aluminum, and the load at the time when the honeycomb fired body 20 was either pushed out or broken was measured, and the resulting value was defined as the push-out strength of the portion at which the honeycomb fired bodies 20 were bonded to each other by interposing the adhesive layer.

Here, the measurements on the push-out strength were carried out by using an Instron universal testing machine (5582 type).

The results of the measurements are shown in Table 1, together with kinds and characteristics of the honeycomb fired bodies manufactured in the present Example and the particle diameter distribution of γ-alumina particles that are ceramic particles contained in the adhesive paste used in the present Example.

Here, Table 1 also shows respective numeric values of other Examples and Comparative Examples.

Example 2

The same processes as those of Example 1 were carried out, except that γ-alumina particles having a 70% particle diameter of 0.08 μpm and an average particle diameter of 0.07 μm were used as the γ-alumina particles to be used for preparing the adhesive paste; thus, a honeycomb structure was manufactured, and then the measurements of the push-out strength was carried out.

Example 3

The same processes as those of Example 1 were carried out except that the firing temperature of the honeycomb fired body was set to 1000° C. so that a honeycomb fired body β was produced. The dimension, the cell density, the thickness of the cell wall and the cross-sectional shape of the cells of this honeycomb fired body β were the same as those of the honeycomb fired body α manufactured in Example 1; however, the measured average pore diameter was 0.2 μm and the measured surface roughness Ra was 2.5 μm.

Moreover, the same processes as those of Example 1 were carried out except that γ-alumina particles having a 70% particle diameter of 0.20 μm and an average particle diameter of 0.18 μm were used as the ceramic particles to be used for preparing an adhesive paste so that the adhesive paste was prepared.

The same processes as those of Example 1 were carried out except that the honeycomb fired bodies β were combined and secured to each other by using the adhesive paste to form a ceramic block; thus, a honeycomb structure was manufactured, and then the measurements of the push-out strength was carried out.

Example 4

The same processes as those of Example 3 were carried out except that γ-alumina particles having a 70% particle diameter of 0.18 μm and an average particle diameter of 0.16 μm were used as the ceramic particles to be used for preparing an adhesive paste; thus, a honeycomb structure was manufactured, and then the measurements of the push-out strength was carried out.

Comparative Examples 1, 2

The same processes as those of Example 1 or Example 3 were carried out except that kinds and characteristics of the manufactured honeycomb fired bodies and the particle diameter distribution of γ-alumina particles that were ceramic particles contained in the material for the adhesive paste were changed as shown in Table 1; thus, a honeycomb structure was manufactured, and then the measurements of the push-out strength was carried out.

TABLE 1

|  | Honeycomb fired body | | | Ceramic particles in adhesive paste | | |
| --- | --- | --- | --- | --- | --- | --- |
|  | Type | Average pore diameter (μm) | Surface roughness (Ra: μm) | 70% particle diameter (μm) | Average particle diameter (μm) | Push out strength (kN) |
| Example 1 | α | 0.1 | 1.9 | 0.10 | 0.09 | 2.74 |
| Example 2 | α | 0.1 | 1.9 | 0.08 | 0.07 | 3.12 |
| Example 3 | β | 0.2 | 2.5 | 0.20 | 0.18 | 3.23 |
| Example 4 | β | 0.2 | 2.5 | 0.18 | 0.16 | 3.53 |
| Comparative Example 1 | α | 0.1 | 1.9 | 0.12 | 0.10 | 1.47 |
| Comparative Example 2 | β | 0.2 | 2.5 | 0.22 | 0.20 | 1.67 |

In each of the honeycomb structures of each of Examples, the 70% particle diameter of ceramic particles contained in the adhesive layers is an average pore diameter or less of the honeycomb fired body; therefore, among the ceramic particles contained in the adhesive layers, the number of those particles having a particle diameter larger than the average pore diameter of the honeycomb fired body is set to 30% or less of the total number of the ceramic particles contained in the adhesive layers. Therefore, in any of Examples, the push-out strength of the honeycomb structure became higher.

In contrast, in any of the honeycomb structures of Comparative Examples, the push-out strength became lower.

In particular, in each of Comparative Examples, although those ceramic particles having a particle diameter that is 1.1 times or more the surface roughness Ra of the side faces of a honeycomb fired body are not contained in the material for the adhesive paste at a rate exceeding 30% by weight, the push-out strength became lower.

The contents of JIS R 1655 and JIS B 0601 are incorporated herein by reference in their entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb structure comprising:
a plurality of pillar-shaped honeycomb fired bodies, each having a large number of cells longitudinally placed in parallel with one another with a cell wall therebetween, all of said cells being open on an end face of said honeycomb fired bodies, said honeycomb fired bodies being combined with one another by interposing adhesive layers containing at least ceramic particles,
wherein,
said honeycomb fired bodies have an average pore diameter of about 0.1 μm to about 0.2 μm, in said ceramic particles contained in said adhesive layers, the number of those particles having a particle diameter larger than an average pore diameter of said honeycomb fired body is set to 30% or less of the total number of said ceramic particles.

2. The honeycomb structure according to claim 1, wherein the ceramic particles contained in said adhesive layers have an average particle diameter of about 0.2 μm or less.

3. The honeycomb structure according to claim 1, wherein said adhesive layers contain an inorganic fiber and/or a whisker.

4. The honeycomb structure according to claim 1, wherein said ceramic particles contained in the adhesive layers include at least one kind selected from the group consisting of alumina, silicon carbide, silica, zirconia, zeolite, mullite and cordierite.

5. The honeycomb structure according to claim 1, which has a catalyst supported thereon.

6. The honeycomb structure according to claim 5, wherein said catalyst contains at least one kind selected from the group consisting of a noble metal, an alkali metal, an alkali-earth metal and an oxide.

7. The honeycomb structure according to claim 1, which is used for converting an exhaust gas from a vehicle.

8. The honeycomb structure according to claim 3, wherein the inorganic fiber and/or the whisker comprise at least one of alumina, silica, silicon carbide, silica-alumina, glass, potassium titanate, and aluminum borate.

9. The honeycomb structure according to claim 1, wherein the honeycomb fired bodies comprise an inorganic particle, and an inorganic fiber and/or a whisker.

10. The honeycomb structure according to claim 9, wherein the inorganic particle comprises at least one of alumina, silica, zirconia, titania, ceria, mullite, and zeolite.

11. The honeycomb structure according to claim 9, wherein the inorganic fiber and/or the whisker comprise at least one of alumina, silica, silicon carbide, silica-alumina, glass, potassium titanate, and aluminum borate.

12. The honeycomb structure according to claim 1, wherein the honeycomb fired bodies are produced by being fired at a temperature of about 500 to about 1200° C.

* * * * *